Aug. 29, 1967  KATSUMI TAKAMI  3,338,100

NON-CONTACT RESONANT THERMOMETER

Filed June 9, 1964

INVENTOR.
Katsumi Takami

BY

Western & Western

United States Patent Office 3,338,100
Patented Aug. 29, 1967

3,338,100
NON-CONTACT RESONANT THERMOMETER
Katsumi Takami, Koganei-shi, Japan, assignor to Kabushiki Kaisha Hitachi Seisakusho, Tokyo-to, Japan, a joint-stock company of Japan
Filed June 9, 1964, Ser. No. 373,697
Claims priority, application Japan, June 12, 1963, 38/30,025
1 Claim. (Cl. 73—351)

This invention relates to a new and improved thermometer of the so-called non-contact type.

Heretofore, there has been proposed a non-contact thermometric technique wherein a resonance circuit (tank circuit) is formed with a capacitor which varies widely in electrostatic capacitance in response to temperature change, and the temperature at a point on a moving object such as, for example, a rotator of a rotary machine, is measured by securing this tank circuit on the rotator and measuring the resonance frequency of this tank circuit from the stationary side of the machine.

The above mentioned technique as heretofore practiced, however, has had the possibility of producing errors as will be hereinafter described.

It is a general object of the present invention to eliminate this possibility of error by a simple device.

The nature, principle, and details of the invention will be best understood by reference to the following description, taken in conjunction with the accompanying drawing in which like parts are designated by like reference characters, and in which.

As conducive to a full understanding and appreciation of the nature and utility of the invention, the following brief consideration of the aforementioned non-contact thermometric technique is presented.

Figure 1:
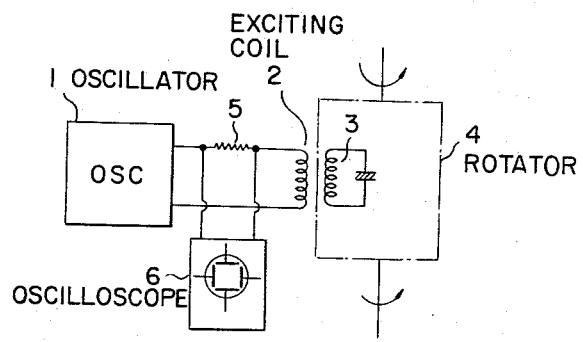
FIGURE 1 is a schematic diagram indicating the operational principle of a non-contact measurement apparatus.

Referring to FIGURE 1, in the temperature measuring apparatus shown therein, a high-frequency current with a frequency as a signal variable is supplied from a variable-frequency oscillator 1 to an exciting coil 2 thereby to cause excitation of a tank circuit 3 secured to, for example, a rotator 4. Since the exciting current becomes a minimum when the tank circuit 3 resonates, if this current is detected by means of a cathode-ray tube oscilloscope 6 as the terminal voltage of a low resistance 5 in the excitation line, the resonance point of the tank circuit can be readily determined. Therefore, by determining and calibrating beforehand the relationship between the resonance frequency and the temperature, the oscillation frequency of the variable-frequency oscillator 1 which causes the indication of the oscilloscope to become a minimum can be utilized to indicate directly the temperature.

In an apparatus of the above described arrangement, a temperature detecting capacitor is used in the tank circuit, and for this capacitor a ferroelectric ceramic capacitor whose operational range is selected to be a range within which the Curie-Weiss law may be considered to be valid is recommended. However, because of technical reasons, it is difficult to produce such ceramic capacitors to have the same capacitances at the same temperature. Ordinarily, deviations of the order of ±20 to 30 percent relative to a standard capacitance must be expected. Accordingly, if no compensation measure with respect to this deviation is to be taken, the resonance frequency will be directly affected by the capacitance deviation of the capacitor, and it will be necessary to resort to calibration for each capacitor in order to measure temperature.

Furthermore, in some cases, the stray capacitance of the lead wire between the inductance coil and the capacitor of the tank circuit cannot be neglected, depending on the length of the lead wire. Still furthermore, when the inductance coil is secured to the rotator, its effective inductance is greatly reduced by the effect of the nearby metallic parts, and this reduction in effective inductance in many cases becomes a great cause of error.

It is a principal object of the present invention to provide simple means for compensating, with relatively high accuracy, for the above described causes of error.

To this end, the invention contemplates effecting this compensation in the frequency determination circuit part of an RC oscillator.

More specifically, the resonant frequency $f$ of the aforementioned temperature detector is given by the following equation:

$$f = \frac{1}{2\pi\sqrt{L_s(kC_s + C_p)}}$$

where:

$k$ is the deviation coefficient of each temperature detecting capacitor;
$C_s$ is the standard capacitance of the temperature detecting capacitor;
$C_p$ is the stray capacitance of the lead wire; and
$L_s$ is the value of the inductance of the coil secured to the rotator.

Figure 2:
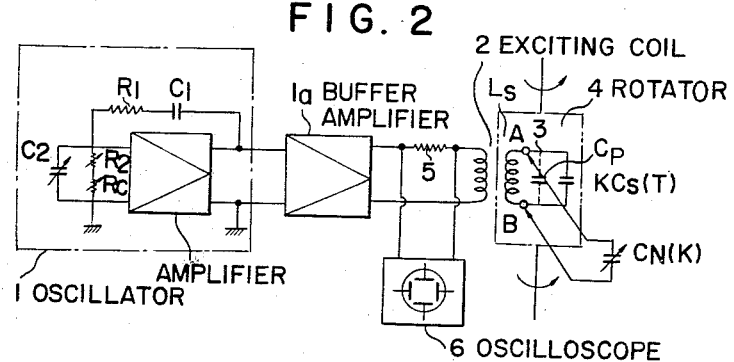
FIGURE 2 is a similar schematic diagram showing the circuit arrangement of one embodiment of the invention.

Furthermore, it had been observed that, in the case where the elements of the feedback circuit in an RC oscillator 1 as shown in FIGURE 2 are composed of $R_1$, $C_1$, $R_2$, $R_c$, and $C_2$ as shown, the oscillation frequency $f$ is given by the following equation:

$$f = \frac{1}{2\pi\sqrt{R_1 C_1 C_2 (R_2 + R_c)}}$$

Accordingly, respective simulation of $C_p$ by $R_c$ and $L_s$ by $C_2$, including $k$, can be effected, whereby it is possible to obtain a correspondence between the capacitance $C_s$ and the resistance $R_2$ without any relationship whatsoever with other external factors.

In one embodiment of the invention as shown in FIGURE 2, the apparatus on the stationary side comprises a variable-frequency oscillator 1 constituting a Wien bridge, the frequency of which can be varied freely by selecting the resistances $R_2$ and $R_c$ and the capacitor $C_2$, a buffer amplifier $1_a$, an exciting coil 2, a low resistance 5, and a cathode-ray oscilloscope 6. On the side of the rotator 4, there is provided a tank circuit 3 secured thereto and including an inductance coil $L_s$. These circuits in coupled combination form a resonance detection circuit which operates in a manner similar to that of the circuit shown in FIGURE 1.

In the circuit arrangement of the above description, the aforementioned causes of error are compensated for in the following manner.

First, the inductance coil $L_s$ is secured on the rotator. Then an air-type variable capacitor $C_N$ having a standard capacitance value at standard temperature is connected to the terminals A and B of the coil $L_s$, the lead wires for this wiring being kept amply short in order to cause the stray capacitances between the lead wires to be approximately equal to zero. Next, the value of $C_N$ is multiplied by $k$, which is the known deviation coefficient (ordinarily of the order of 0.8 to 1.2) of the ceramic capacitor. Then the value of the resistance $R_c$ is set to zero, and the resistance $R_2$ is so adjusted that $R_2 = R_{20}$, where $R_{20}=\eta C_N$ where $\eta$ is a constant. The above relationships are those required for the compensation according to the invention.

On the other hand, in consideration of the range of variation of the capacitance of the ceramic capacitor, the capacitor $C_1$ and the resistance $R_1$ are fixed at appropriate values.

Under the above described conditions, the capacitor $C_2$ is adjusted to attain tuning, whereupon from $$C_1R_1 \cdot C_2 \cdot R_{20} = L_s \cdot kC_N \qquad (1)$$

the following equation is derived:

$$C_2 = \frac{k}{\eta C_1 R_1} \cdot L_s \qquad (2)$$

That is, this means that the value of $L_s$, including the deviation coefficient, has been simulated on the oscilator side.

Next, the standard capacitor $C_N$ is removed, and a ceramic capacitor $C_s(T)$ for temperature detection is connected, together with its lead wire, to the terminals A and B, this capacitor $C_s(T)$ and the lead wire being secured in a closely contacting manner to the rotating member 4 so as to suppress the effect of stray capacitance. Then, the resistance $R_2$ is adjusted so that it corresponds to the value of $C_s(T_a)$ at the ambient temperature. In this case, it is necessary to establish, beforehand, the calibration of the variable resistor $R_2$ as a temperature calibration so as to satisfy the relationship expressed by the following equation:

$$R_2 = \eta C_s(T) \qquad (3)$$

Actually, therefore, the resistance $R_2$ is adjusted in accordance with the ambient temperature $T_a$.

With the device in the above described state, the resistance $R_c$ is then adjusted to effect tuning. In this case, since the value of the capacitor $C_2$ has been previously determined, the following equations are derived:

$$C_1R_1 \cdot C_2 \cdot (R_{T_a} + R_c) = L_s\{C_p + kC_s(T_a)\} \quad R_c = \frac{\eta C_p}{k} \qquad (4)$$

where $C_o$ is the stray capacitance of the lead wire, and
$C_s(T_a)$ is the electrostatic capacitance of the ceramic capacitor at room temperature.

Thus, this means that $C_p$, including $k$ and $\eta$, is simulated on the oscillator side irrespective of the values of the coil $L_s$. Therefore, if the capacitor $C_2$ and the resistor $R_c$ are placed in fixed states, direct reading of the value of $C_s(T)$, that is, the temperature of the rotator, can be accomplished through only the value of the resistance $R_2$.

By the use of the thermometric device of the invention as described above, it is necessary to calibrate the resistor $R_2$ only with respect to the standard value of the capacitor $C_s(T)$. For example, even if there is a deviation of $k$ times in the capacitor $C_s(T)$, this can be compensated for with $C_2$. Accordingly, it is not necessary to obtain a calibration curve for each individual ceramic capacitor.

On the other hand, in the device of this invention, the temperature calibration scale corresponding to $C_s(T)$ is indicated on a variable resistor. Therefore, the device has the unique advantage of increasing resolution of temperature indication with increase in resolution of the resistor, for example, by using a variable resistor of helical type.

If this were to be effected by means of a variable capacitor of an LC oscillator, the rotational angle of the variable capacitor is limited within the range of from 0 to 180 degrees, and, accordingly, the resolution also would be limited. Furthermore, if the value of $C_p$ were to be simulated by the C part of an LC oscillator, this value, itself, would become extremely small. Therefore, it would be very difficult to obtain accurate and faithful simulation.

In contrast, in the device according to the present invention, the resistance $R_c$ is used, whereby amply fine adjustment becomes possible, and a corresponding improvement in accuracy of measurement is obtainable. It is to be observed that a similar effect can be obtained by fixing the values of the capacitors $C_1$ and $C_2$ and using variable resistors for the resistances $R_1$ and $R_2$.

Figure 3:
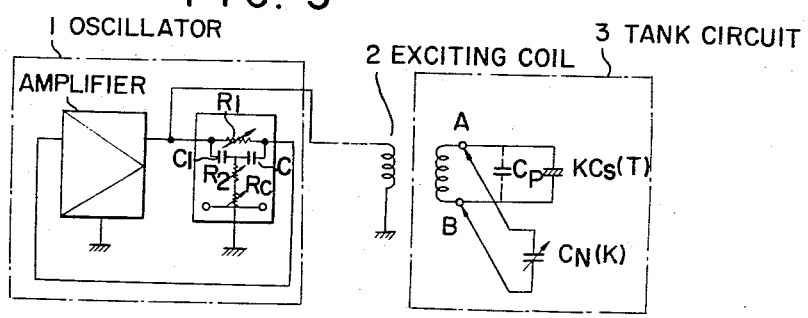
FIGURE 3 is a schematic diagram showing the circuit arrangement of another embodiment of the invention.

While in the foregoing description a Wien bridge is used as an example, the use of a bridged T-RC oscillator as indicated in FIGURE 3 for the compensation device produces equivalent results. In this case, the resistors $R_1$, $R_2$, and $R_c$ are made variable, and the resistor $R_2$ is provided with a temperature calibration scale.

Similar results can be obtained also by the use of certain other oscillators such as a parallel T-RC oscillator and a Sulzer oscillator.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claim.

I claim:

A non-contact thermometer comprising a resonant circuit fixed on an arbitrary portion of a rotating object, said resonant circuit comprising an inductance element having fixed value, a capacitor having temperature dependency, and a lead wire to connect said inductance element and the capacitor, wherein the fluctuation coefficient of the value of said capacitor is $k$ and stray capacitance of said lead wire is $C_p$; and an oscillator for feeding signals to said resonant circuit through an exciting coil magnetically coupled with said inductance element, said oscillator comprising an amplifier and a frequency determining circuit composed of resistances $R_1$, $R_2$, $R_c$, and capacitors $C_1$, $C_2$, the oscillation frequency $f$ of which is represented by the equation $$f = \frac{1}{2\pi\sqrt{r_1 c_1 c_2 (r_2 + r_c)}}$$

wherein $r_1$, $r_2$, $r_c$, $c_1$ and $c_2$ respectively are values of said resistors $R_1$, $R_2$, $R_c$ and said capacitors $C_1$ and $C_2$, said stray capacitance $C_p$ being simulated by the resistance $R_c$ including $k$ as $$r_c = \frac{\eta C_p}{k}$$

wherein $\eta$ is the reduction factor, and the value $L_s$ of said inductance element is simulated by the capacitor $C_2$ including $k$ as $$C_2 = \frac{k}{\eta c_1 r_1} L_s$$

whereby the temperature of said rotating body can be directly measured irrespective of the fluctuation of said capacitor and stray capacitance of said lead wire.

References Cited

UNITED STATES PATENTS

| | | | |
|---|---|---|---|
| 2,370,818 | 3/1945 | Silverman. | |
| 2,575,922 | 11/1951 | Langenwalter | 73—362 X |
| 2,818,732 | 1/1958 | Bennett | 73—362 |
| 3,046,479 | 7/1962 | Mead et al. | 324—61 |
| 3,087,886 | 4/1963 | Robinson | 73—362 |
| 3,112,070 | 11/1963 | Seney | 73—351 X |
| 3,238,453 | 3/1966 | Henry et al. | 342—61 |

LOUIS R. PRINCE, *Primary Examiner.*

S. BAZERMAN, F. SHOON, *Assistant Examiners.*